(12) United States Patent
Fernandez

(10) Patent No.: US 9,415,395 B2
(45) Date of Patent: Aug. 16, 2016

(54) WEAR PLATE FASTENING SYSTEM, ARRANGEMENT AND METHOD

(75) Inventor: Ricardo Francisco Doberti Fernandez, Santiago (CL)

(73) Assignee: VULCO S.A., Santiago (CL)

( * ) Notice: Subject to any disclaimer, the term of this patent is extended or adjusted under 35 U.S.C. 154(b) by 407 days.

(21) Appl. No.: 13/642,508

(22) PCT Filed: Apr. 19, 2011

(86) PCT No.: PCT/AU2011/000444
§ 371 (c)(1),
(2), (4) Date: Feb. 18, 2013

(87) PCT Pub. No.: WO2011/130782
PCT Pub. Date: Oct. 27, 2011

(65) Prior Publication Data
US 2013/0140387 A1    Jun. 6, 2013

(30) Foreign Application Priority Data

Apr. 19, 2010  (CL) .................................. 0384-2010
Jul. 22, 2010  (AU) ............................... 2010903280

(51) Int. Cl.
*B02C 17/22* (2006.01)
*B23P 11/00* (2006.01)

(52) U.S. Cl.
CPC ................. *B02C 17/22* (2013.01); *B23P 11/00* (2013.01); *Y10T 29/49948* (2015.01)

(58) Field of Classification Search
CPC ....... B02C 17/22; B02C 17/225; B23P 11/00; Y10T 29/49948

USPC .................................. 241/182, 183, 299, 300
See application file for complete search history.

(56) References Cited

U.S. PATENT DOCUMENTS

| | | | |
|---|---|---|---|
| 1,601,956 A | 10/1926 | Gammeter | |
| 2,058,257 A | 10/1936 | Porteous | |
| 2,820,499 A | 1/1958 | Schaaf | |
| 3,804,346 A | 4/1974 | Norman | |
| 3,883,080 A | 5/1975 | Andersson | |
| 4,141,511 A | 2/1979 | Anderson | |
| 4,235,386 A * | 11/1980 | Larsen | B02C 17/22 |
| | | | 241/182 |
| 4,289,279 A | 9/1981 | Brandt | |
| 4,394,982 A | 7/1983 | Wilson | |
| 4,583,575 A * | 4/1986 | Lundmark | B27L 1/025 |
| | | | 144/208.9 |

(Continued)

FOREIGN PATENT DOCUMENTS

| | | |
|---|---|---|
| AU | 557151 B2 | 12/1986 |
| AU | 200210025 A1 | 2/2002 |

(Continued)

OTHER PUBLICATIONS

Written Opinion of PCT/AU2011/000443 dated Jul. 7, 2011.

(Continued)

*Primary Examiner* — Mark Rosenbaum
(74) *Attorney, Agent, or Firm* — Gardere Wynne Sewell, LLP

(57) ABSTRACT

A wear plate system comprises a wear plate for mounting to the inside of a grinding mill A fastening arrangement comprises an elongate coupling member having a first end arranged to secure to the wear plate such that when so secured the coupling member is arranged to pivot with respect to the wear plate. A second end of the elongate coupling member secures to the grinding mill.

23 Claims, 3 Drawing Sheets

(56) References Cited

U.S. PATENT DOCUMENTS

| | | |
|---|---|---|
| 4,609,158 A | 9/1986 | Wilson |
| 5,037,258 A | 8/1991 | Heurteux |
| 5,752,665 A | 5/1998 | Wason |
| 5,950,944 A | 9/1999 | Larsen |
| 6,082,646 A | 7/2000 | Clarke et al. |
| 2005/0082403 A1 | 4/2005 | Boast |
| 2008/0265074 A1 | 10/2008 | Melo et al. |
| 2010/0025512 A1 | 2/2010 | Liimatainen et al. |
| 2010/0233420 A1 | 9/2010 | Ghosh et al. |
| 2013/0105609 A1 | 5/2013 | Fernandez |

FOREIGN PATENT DOCUMENTS

| | | |
|---|---|---|
| CL | 0162-1993 | 2/1992 |
| CL | 0705-1997 | 4/1997 |
| CL | 3043-2005 | 12/2004 |
| CL | 1425-2006 | 6/2005 |
| CL | 2008-2008 | 7/2007 |
| CL | 1153-2009 | 5/2009 |
| CL | 1661-2009 | 7/2009 |
| CL | 1662-2009 | 7/2009 |
| CL | 0359-2010 | 4/2010 |
| CL | 0385-2010 | 4/2010 |
| CL | 2053-2009 | 11/2011 |
| CL | 0102-2005 | 3/2012 |
| CN | 2288009 Y | 8/1998 |
| CN | 2292609 Y | 9/1998 |
| CN | 1846867 A | 10/2006 |
| CN | 101107076 A | 1/2008 |
| DE | 10047095 A1 | 4/2002 |
| FR | 2615410 | 11/1988 |
| GB | 1431618 A | 4/1976 |
| SU | 635311 A1 | 11/1978 |
| SU | 1230682 A1 | 5/1986 |
| WO | WO-2005/087378 A1 | 9/2005 |
| WO | WO-2009/094705 A1 | 8/2009 |
| WO | WO-2011/130781 A1 | 10/2011 |

OTHER PUBLICATIONS

International Preliminary Report on Patentability of PCT/AU2011/000443 dated Feb. 24, 2012.

International Search Report of PCT/AU2011/000443 dated Jul. 7, 2011.

\* cited by examiner (a)                                                 (b)

(a)                                                 (b)

(a)                                                 (b)

WEAR PLATE FASTENING SYSTEM, ARRANGEMENT AND METHOD

TECHNICAL FIELD

This disclosure relates to a system and method for installation and removal of a wear plate for use in a grinding mill, and in particular autogenous (AG) and semi-autogenous (SAG) grinding mills.

BACKGROUND

Wear plates (also referred to as "wear liners") are used in the mining industry to protect the interior shell of a grinding mill.

It is known to fasten wear plates to the mill wall from the inside of the grinding mill using long bolts. The installation process involves locating a head of the bolt in a tapered socket which extends through the wear plate. A shank of the bolt is then passed through a wall of the grinding mill, with a nut fastened over a threaded end of the bolt from the outside. However, such installation techniques are time consuming due to the need to precisely align the bolt shanks with the through holes in the mill wall. Furthermore, in view of the considerable weight of the wear plates, there is a risk that operators installing the plates from the inside of the mill may be injured due to a wear plate coming loose during installation.

The removal process is equally time consuming since a build-up of finely ground particulate ore material in and around the tapered sockets and bolts can cause the wear plates to stick to the mill wall. To overcome this, the bolt ends may be hammered from the outside, while operators inside the mill attempt to lever the wear plates from off the wall. It will be appreciated that the removal process also presents a significant risk to the operators due to the wear plates dropping unexpectedly once the nuts have been removed. Another disadvantage is that the bolts are unable to be re-used due to head damage sustained during operation of the mill and as a result of damage to the shank and threaded end from hammering.

It would be advantageous if one or more embodiments of the present disclosure addressed at least one of the disadvantages outlined above.

SUMMARY

In a first aspect, embodiments are disclosed of a wear plate system comprising:
a wear plate for mounting to the inside of a grinding mill; and
a fastening arrangement comprising an elongate coupling member, the elongate coupling member having a first end arranged to secure to the wear plate such that when so secured the coupling member is arranged to pivot with respect to the wear plate, and a second end arranged to secure to the grinding mill.

In certain embodiments, the elongate coupling member may be arranged to pivot in two or more planes substantially orthogonal to a surface of the wear plate arranged to confront a wall of grinding mill.

In certain embodiments, the elongate coupling member can be arranged to pivot about a point at which the first end secures to the wear plate.

In certain embodiments, the elongate coupling member can be arranged to pivot by at least +/−5 angle degrees. In further embodiments, the elongate coupling member can be arranged to pivot by as much as +/−10 angle degrees.

In certain embodiments, the fastening arrangement comprises a retaining member coupled to the wear plate, the retaining member arranged to receivingly engage the first end of the elongate member and having an adjustable orientation which allows the elongate member to pivot with respect to the wear plate.

In certain embodiments, the retaining member may be a nut having an internal thread arranged to receive a correspondingly threaded portion disposed on the first end of the elongate member. In certain embodiments, the nut may be retained within a housing defined in a wall of the wear plate, the nut having a freedom of movement within the housing for permitting the adjustable orientation.

In certain embodiments, the housing may comprise an open ended cavity comprising a circumferential shoulder portion at the open end for retaining the nut therein. In certain embodiments, the wear plate system may further comprise a seal arranged to seat in a recess in the wear plate wall which surrounds the open ended cavity.

In certain embodiments, the first end of the elongate member terminates in a tapered locating portion, such that when presented to the nut, the tapered location portion facilitates adjustment of the nut orientation for alignment with a longitudinal axis of the elongate member. In certain embodiments, the tapered locating portion may have the form of a truncated cone. In certain embodiments of the wear plate system, both the housing and nut can have a square cross sectional profile.

In certain embodiments, the second end of the elongate member may be arranged to extend through a wall of the grinding mill and comprises a threaded portion for securing to a fastening nut. In certain embodiments, the second end may further comprise a tool receiving portion for facilitating screwing of the elongate member into and out of the wear plate retaining nut.

In a second aspect, embodiments are disclosed of a fastening arrangement for a wear plate for mounting to the inside of a grinding mill, the fastening arrangement comprising an elongate coupling member having a first end arranged to secure to the wear plate such that when so secured the coupling member is arranged to pivot with respect to the wear plate, and a second end arranged to secure to the grinding mill.

In certain embodiments, the fastening arrangement may further comprise a retaining member for coupling to the wear plate and being arranged to receivingly engage the first end of the elongate member, the retaining member having an adjustable orientation which allows the elongate member to pivot with respect to the wear plate.

In certain embodiments, the retaining member can be a nut having an internal thread arranged to receive a correspondingly threaded portion disposed on the first end of the elongate member. In certain embodiments, in use, the nut can be retained within a housing defined in a wall of the wear plate, the nut having a freedom of movement within the housing for permitting the adjustable orientation.

In certain embodiments, the fastening arrangement may further comprise a seal arranged in use to seat in a recess in the wear plate wall which at least partially surrounds the open ended cavity.

In certain embodiments, the first end of the elongate member may terminate in a tapered locating portion, such that when presented to the nut, the tapered location portion facilitates adjustment of the nut orientation for alignment with a longitudinal axis of the elongate member. In certain embodiments, the tapered locating portion can have the form of a truncated cone. In certain embodiments, the both the housing and nut can have square circumferential profiles.

In certain embodiments, the second end of the elongate member can be arranged to extend through a wall of the grinding mill and comprises a threaded portion for securing to a fastening nut.

In certain embodiments, the second end may further comprises a tool receiving portion for facilitating screwing of the elongate member into and out of the wear plate retaining nut.

In a third aspect, embodiments are disclosed of a wear plate for a grinding mill comprising:
 a body having a confronting wall; and
 a retaining member coupled to the body and being arranged to receivingly engage a first end of an elongate coupling member arranged to couple to the grinding mill, the retaining member having an adjustable orientation with respect to the confronting wall which allows the elongate coupling member to pivot with respect to the wear plate in use.

In certain embodiments, the retaining member may be a nut having an internal thread arranged, in use, to receive a correspondingly threaded portion disposed on the first end of the elongate member.

In certain embodiments, the body may further comprise an open-ended cavity defined in the confronting wall and having a circumferential shoulder portion at the open end for retaining the nut therein, in use the nut being arranged to secure to a first end of the elongate coupling.

In certain embodiments, the wear plate may further comprise a recessed seat portion surrounding the open ended cavity for receiving a seal.

In certain embodiments, both the housing and nut can have square circumferential profiles.

In a fourth aspect, embodiments are disclosed of a grinding mill which can comprise a wear plate system of the first aspect, a fastening arrangement of the second aspect, or a wear plate of the third aspect.

In a fifth aspect, embodiments are disclosed of a method of installing a wear plate system of the first aspect, the method comprising:
 presenting the wear plate to a section of the mill wall such that the second end of the elongate member is located near a through hole defined therethrough;
 adjusting an orientation of the elongate coupling member such that a longitudinal axis of the elongate coupling member is aligned with the through hole; and
 once aligned, passing the second end through the through hole for securing externally of the mill wall.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
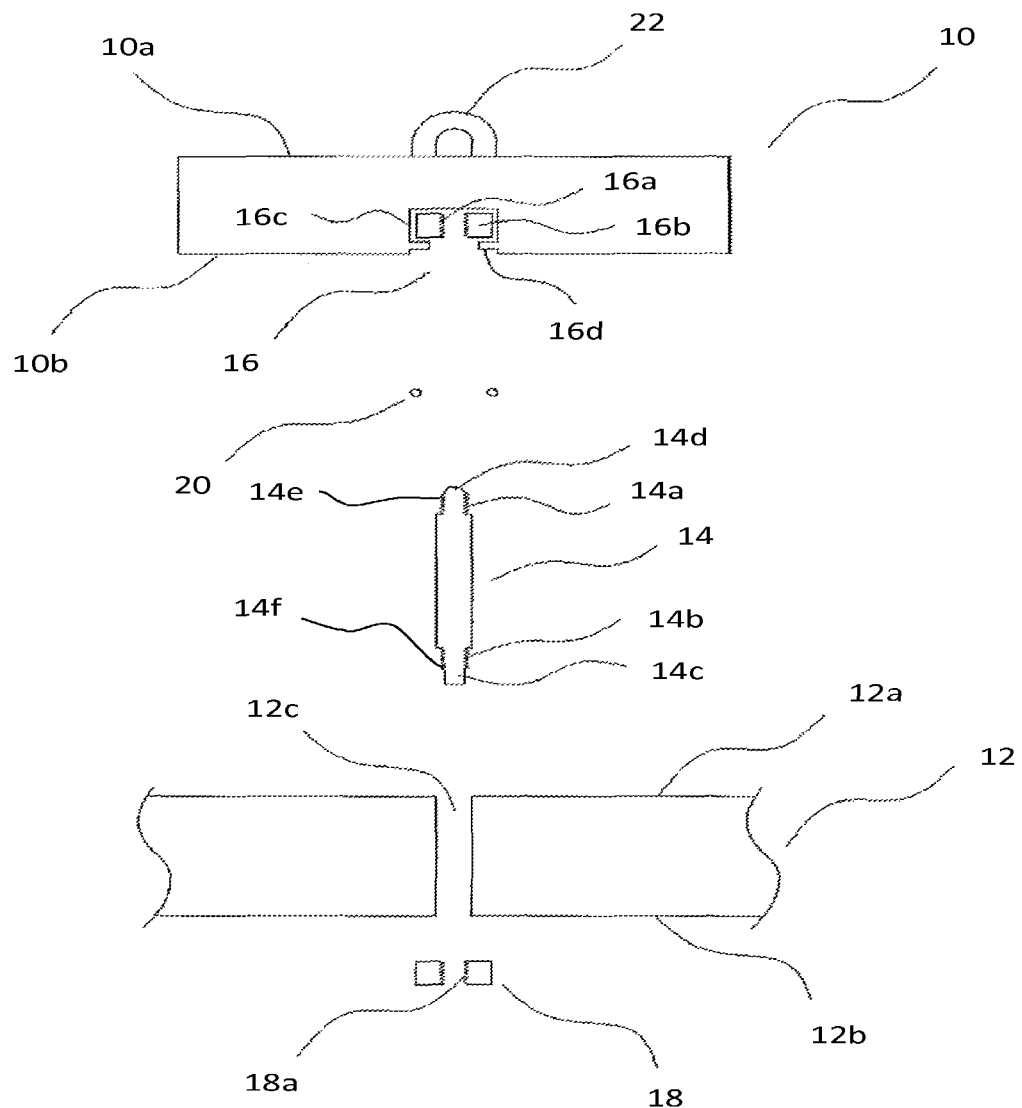
FIG. 1 is an exploded sectional front view of a wear plate system in accordance with certain embodiments.

With reference to FIG. 1, there is shown an exploded schematic view of a wear plate system in accordance with one embodiment. It will be understood that the wear plate 10 is used to protect the interior surface 12a of a grinding mill wall 12 which in use is subject to abrasion from various particulate mineral ore materials circulating within the grinding mill.

The system comprises at least one wear plate 10 having a wear face 10a, which is progressively worn out during the life of the wear plate 10. On the opposite side of the wear plate 10 to the wear face 10a is a confronting face 10b which is arranged to be placed into a close-facing relationship with, the internal surface 12a of the mill wall 12 which is to be protected by the wear plate 10.

Figure 2:
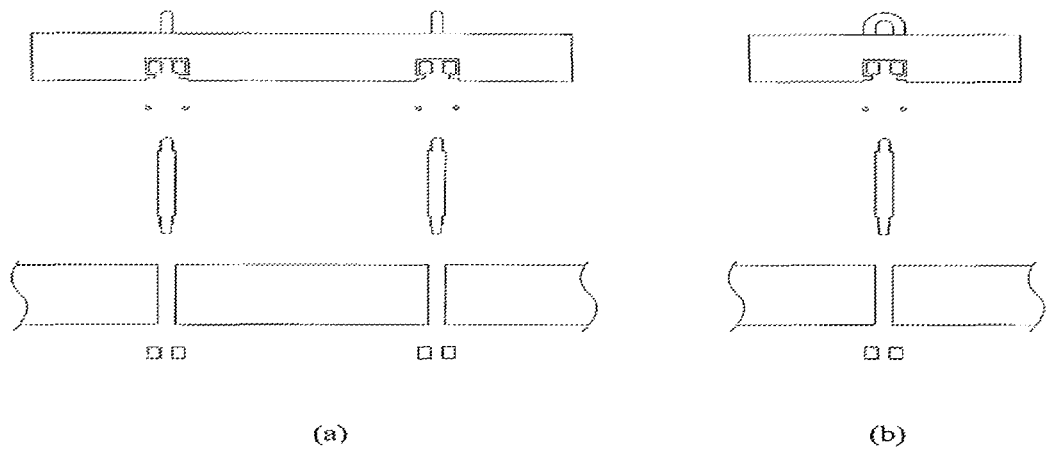
FIGS. 2a and 2b show an exploded sectional front and side view, respectively, of the wear plate system shown in FIG. 1.
Figure 4:
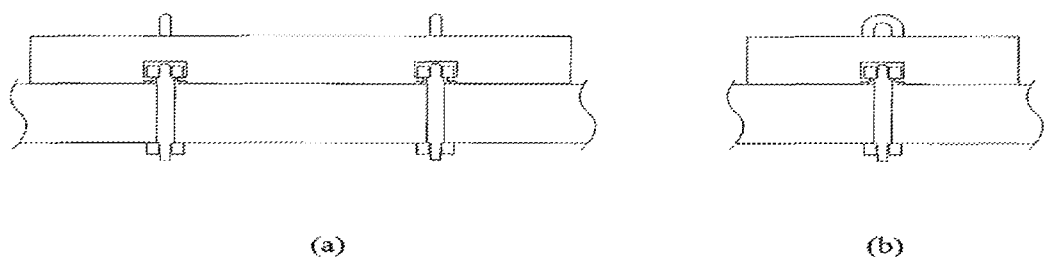
FIGS. 4a and 4b show an assembled sectional front and side view, respectively, of the wear plate system shown in FIG. 1 when fastened to a mill wall.

The wear plate system further comprises a fastening arrangement comprising an elongate coupling member 14 in the form of a bolt 14 having a first end 14a for securing to the wear plate 10 such that, when so secured, the bolt 14 is arranged to pivot with respect to the wear plate 10 for facilitating alignment of the bolt 14 with corresponding through holes 12c in the mill wall during installation (as will be described in more detail in subsequent paragraphs). A second end 14b of the bolt 14 secures to the grinding mill for fastening the wear plate 10 to the grinding mill wall 12. According to the embodiment described herein, each wear plate 10 is secured to the mill wall 12 using two bolts 14, as is best shown in the sectional front view of FIG. 2. An assembled sectional view of the wear plate system is shown in FIG. 4.

In more detail, the pivoting action is achieved by way of a retaining member coupled to the wear plate 10 and which is arranged to receivingly engage the first end 14a of the bolt 14. The retaining member has an adjustable orientation with respect to the wear plate 10 and to the confronting face 10b of the wear plate 10, which allows the bolt 14 to pivot about a point at which the bolt 14 secures to the wear plate 10. In the illustrated embodiment, the retaining member is in the form of a nut 16 having an internal thread 16a that is arranged to receive a correspondingly threaded end portion 14e of the bolt 14.

The nut 16 is housed within a cavity 16c located in the wear plate 10 which is of slightly larger dimension than the nut 16, thus allowing a freedom of movement within the cavity 16c for permitting the adjustable orientation. The cavity 16c opens into the confronting face 10b of the wear plate 10, and comprises a circumferential shoulder portion 16d for retaining the nut 16 within the cavity 16c.

Figure 3:
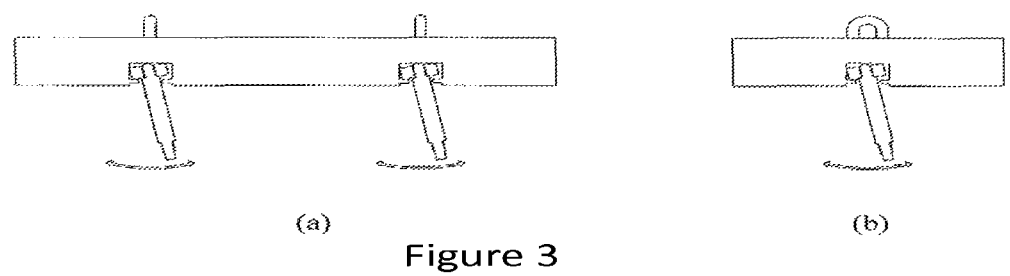
FIGS. 3a and 3b show a partially assembled sectional front and side view, respectively, of the wear plate system shown in FIG. 1.

Both the nut 16 and the cavity 16c have a square circumferential profile which allows the bolt 14 to pivot in two planes orthogonal to the confronting face 10b. The relative cavity 16c and nut 16 dimensions are selected so as to allow the bolt to pivot by at least +/−5 angle degrees in each of the two planes and preferably by +/−10 angle degrees. This is best shown in the sectional side and front views of FIG. 3. It will be understood that the non-circular circumferential profile of the nut 16 and the cavity 16c also operate to prevent the nut 16 from being inadvertently rotated out of threaded engagement with the bolt 14 during operation.

With reference to FIGS. 5 through 8, it can be seen that the first end 14a of the bolt 14 terminates in a tapered locating portion 14d which, when presented to the nut 16, acts to adjust the orientation of the nut 16 for correct alignment with the bolt 14 during installation. In the illustrated embodiment, as best shown in FIG. 1, the tapered portion 14d has the form of a truncated cone and lies immediately adjacent to the threaded portion 14e. It will be appreciated that the locating portion 14d may not only advantageously reduce the time needed to position and screw the threaded end 14a to the nut 16, but also operate to protect these components from being damaged as a result of the excessively high stresses imparted on the fastening arrangement during installation and removal of the wear plate 10.

Figure 5:
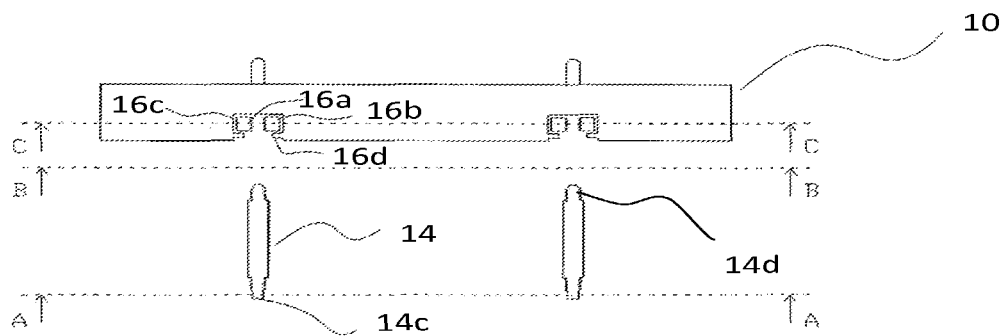
FIG. 5 is a sectional front view of certain embodiments of various wear plate fastening elements showing imaginary lines A-A, B-B and C-C.
Figure 6:
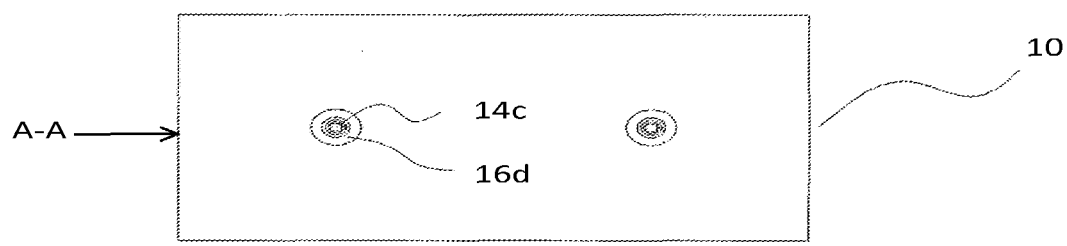
FIGS. 6, 7 and 8 are schematic sectional views through lines A-A, B-B and C-C, respectively, shown in FIG. 5 when the wear plate fastening elements are in an assembled state.
Figure 7:
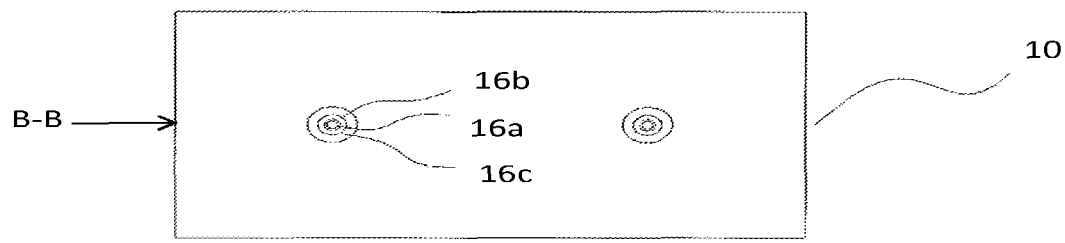
Figure 8:
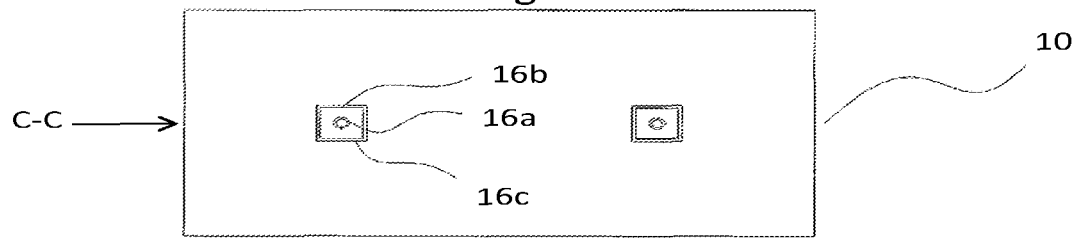

As previously described, the wall 12 comprises a through hole 12c which extends between the internal surface 12a and external surface 12b of the mill wall 12. During installation, the second end 14b of the bolt 14 is arranged to pass through the through hole 12c and out of the external surface 12b. A second nut 18 is arranged to screw onto a threaded portion 14f disposed on the second end 14b, as is best shown in FIG. 1 and in FIG. 4. With particular reference to FIGS. 5 and 6, the second end 14b is provided with a tool receiving portion 14c spaced apart from the threaded portion 14f for facilitating screwing or unscrewing of the bolt 14 from the wear plate nut 16, by means of a suitable tool. For example, the tool receiving portion 14c may have a hexagonal profile which allows the bolt to be rotated using an allen key or the like. It will be understood that other profiles and tools could equally be used to facilitate the rotation of the bolt 14.

A seal 20 is arranged to be seated in use within a recess (such as a circumferential shoulder) surrounding the cavity 16d at the confronting face 10b of the wear plate 10 (see particularly FIGS. 1 and 4). The seal 20 may advantageously prevent the through holes 12c defined in the mill wall 12 from becoming contaminated with fine particulate materials during grinding operation, and in turn protecting the bolt 14 and allowing it to be re-used.

According to the illustrated embodiment, the system further comprises handles 22 which are loop-shaped and fixed to the wear face 10a of the wear plate 10. The handles 22 are advantageously shaped for gripping by a machine such as an automated lifting tool or a mechanised robot (not shown) which is arranged to assist with the handling and installation of the wear plates.

Two alternative modes of installing a wear plate system according to according to certain embodiments are outlined below.

Installation Mode A:

In a first step the first threaded end 14a of the bolt 14 is screwed into the thread 16a of the nut 16. A handling robot then grips the handles 22 and brings the second end 14b of the bolt 14 in close proximity to the through hole 12c defined in the mill wall 12. The second end 14b of the bolt 14 is then pivoted into alignment with the through hole 12c (e.g. by an operator). Once aligned, the robot pushes the wear plate 10 towards the surface 12a of the wall 12, causing the second end 14b to pass through the through hole 12c and out of the outer surface 12b. The wear plate is then fastened to the mill wall 12 by screwing the second nut 18 over the threaded end 14f to bring the second nut 18 into contact with the outer surface 12b of the mill wall 12.

Installation Mode B:

A handling robot grips the handles 22 and brings the cavity 16c in relative proximity to the through holes 12c defined in the mill wall 12. Guides (either installed in the mill wall 12 or wear plate 10) may optionally be used to more accurately guide the robot. The bolt 14 is then passed through the holes 12c from the outside of the mill, with the tapered guide portion 14d acting to adjust the orientation of the nut 16 such that the nut thread 16a is suitably aligned with the threaded end 14e of the bolt 14. A suitable tool then secures to the tool receiving portion 14c for screwing the bolt 14 into registration with the nut 16 by a rotating action taken from the outside of the mill. The second nut 18 is then screwed onto the threaded portion 14f in the same manner described above.

A process for removing the wear plate 10 will now be described. In a first step the second nut 18 is unscrewed from the outside of the mill. Still from the outside of the mill, the threaded portion 14e of the bolt 14 is unscrewed from the nut 16 using a suitable tool connected to the tool receiving portion 14c. Gravity then acts on the wear plate 10 causing it to fall inside the mill. In the event that the wear plates have stuck to the wall during operation, they may be loosened using a suitable impact tool, an end of which is introduced through the through holes 12c for applying a percussive impact force on the wear plate 10.

It will be appreciated that by virtue of the pivotable fastening arrangement, the alignment of the wear plates can be quickly carried out, decreasing the overall time required to install the wear plates compared with known arrangements. Furthermore, the double threaded end configuration of the coupling bolt allows for the wear plates to be loosened from the mill wall without requiring assistance from operators within the mill, thus greatly increasing operator safety.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A system for fastening a wear plate comprising:
    a wear plate for mounting to the inside of a grinding mill;
    an elongate coupling member for inserting through a void in a wall of the grinding mill, the elongate coupling member having a first threaded end for securing to the wear plate and a second end for securing to the grinding mill wall;
    a nut retained within an open ended cavity disposed in a mill wall confronting surface of the wear plate and arranged to threadingly receive the first threaded end of the elongate coupling member for securing thereto, wherein the nut has an adjustable pivotable orientation within the cavity for facilitating the threaded reception of the first threaded end of the elongate coupling member and wherein when the first threaded end is secured to the nut the elongate coupling member is arranged to pivot by at least +/−5 angle degrees with respect to the mill wall confronting surface.

2. A wear plate system in accordance with claim 1, wherein the elongate member is arranged to pivot in two or more planes substantially orthogonal to the mill wall confronting surface.

3. A wear plate system in accordance with claim 2, wherein the elongate member is arranged to pivot by +/−10 angle degrees with respect to the mill wall confronting surface.

4. A wear plate system in accordance with claim 1, wherein the nut has an internal thread which corresponds to the thread of the first end of the elongate member.

5. A wear plate system in accordance with claim 1, wherein the open ended cavity comprises a circumferential shoulder portion at the open end for retaining the nut therein.

6. A wear plate system in accordance with claim 1, further comprising a seal arranged to seat in a recess in the mill wall confronting surface and which at least partially surrounds the open ended cavity.

7. A wear plate system in accordance with claim 1, wherein the first end of the elongate member terminates in a tapered locating portion, such that when presented to the nut, the tapered location portion facilitates adjustment of the nut orientation for alignment with a longitudinal axis of the elongate member.

8. A wear plate system in accordance with claim 7, wherein the tapered locating portion has the form of a truncated cone.

9. A wear plate system in accordance with claim 1, wherein the nut has a square cross sectional profile.

10. A wear plate system in accordance with claim 1, wherein the second end of the elongate member comprises a head portion for engaging an outer surface of the mill wall.

11. A wear plate system in accordance with claim 1, wherein the second end further comprises a tool receiving portion for facilitating screwing of the first threaded end of the elongate member into and out of the retaining nut.

12. A fastening arrangement for a wear plate for mounting to the inside of a grinding mill, the fastening arrangement comprising:
    an elongate coupling member;
    a nut for being retained within an open ended cavity formed in a mill wall confronting surface of the wear plate, and the nut arranged to threadingly receive a first threaded end portion of the elongate coupling member which is in turn arranged to secure to a wall of the grinding mill, wherein the nut has an adjustable pivotable orientation within the cavity for facilitating the threaded reception of the first threaded end of the elongate coupling member, and wherein when the nut is secured to the first threaded end of the elongate coupling member, the elongate coupling member is arranged to pivot by at least +/−5 angle degrees with respect to the mill wall confronting surface.

13. A fastening arrangement in accordance with claim 12, wherein the elongate coupling member is arranged to pivot in two or more planes substantially orthogonal to the mill wall confronting surface.

14. A fastening arrangement in accordance with claim 13, wherein the elongate coupling member is arranged to pivot by +/−10 angle degrees with respect to the mill wall confronting surface.

15. A fastening arrangement in accordance with claim 12, wherein the open ended cavity comprises a circumferential shoulder portion at the open end for retaining the nut therein.

16. A fastening arrangement in accordance with claim 12, further comprising a seal arranged in use to seat in a recess in the mill wall confronting surface and which at least partially surrounds the open ended cavity.

17. A fastening arrangement in accordance with claim 12, wherein the nut has a square circumferential profile.

18. An assembly for a grinding mill, the assembly comprising:
    a body having a mill wall confronting surface; and
    a fastening arrangement comprising:
        an elongate coupling member;
        a nut for being retained within an open ended cavity formed in the mill wall confronting surface of the body, and the nut arranged to threadingly receive a first threaded end portion of the elongate coupling member which is in turn arranged to secure to a wall of the grinding mill, wherein the nut has an adjustable pivotable orientation within the cavity for facilitating the threaded reception of the first threaded end of the elongate coupling member, and wherein when the nut is secured to the first threaded end of the elongate coupling member, the elongate coupling member is arranged to pivot by at least +/−5 angle degrees with respect to the mill wall confronting surface of the body.

19. An assembly in accordance with claim 18, wherein the open-ended cavity has a circumferential shoulder portion at the open end for retaining the nut therein.

20. An assembly in accordance with claim 19, further comprising a recessed seat portion surrounding the open ended cavity for mounting a seal.

21. An assembly in accordance with claim 18, wherein the nut has a square circumferential profile.

22. A method of installing a wear plate system as claimed in claim 1, the method comprising:
    presenting the wear plate to a section of the mill wall such that the open ended cavity is located near a through hole defined in the mill wall;
    inserting the first end of the elongate coupling member through the through hole from outside of the mill wall for presenting to the nut; and
    once presented, screwing the elongate coupling member into the nut from outside of the mill wall until the wear plate is fastened to the section of the mill wall.

23. An assembly for a grinding mill, the assembly comprising:
    a body having a grinding mill wall confronting surface; and
    a wear plate fastening arrangement for use with an elongate coupling member having at least a first threaded member to couple the assembly to a wall of the grinding mill, the wear plate fastening arrangement including:
        a nut configured to be retained within a cavity formed in the grinding mill wall confronting surface of the body of the assembly, and the nut arranged to threadingly receive the first threaded end portion of the elongate coupling member, wherein the nut is pivotable within the cavity and configured for threaded reception of the first threaded end of the elongate coupling member, and wherein when the nut is retained within the cavity when secured to the first threaded end of the elongate coupling member, the elongate coupling member may pivot by at least +/−5 angle degrees with respect to the grinding mill wall confronting surface of the body of the assembly.

* * * * *